United States Patent [19]

Hill

[11] Patent Number: 5,383,302

[45] Date of Patent: Jan. 24, 1995

[54] APPARATUS AND METHOD FOR GROWING STRONGLY-ROOTED TREES, AND PREVENTING ROOT DAMAGE TO HARDSCAPES

[76] Inventor: Ronald F. Hill, 21322 Bulkhead Cir., Huntington Beach, Calif. 92646

[21] Appl. No.: 958,271

[22] Filed: Oct. 8, 1992

[51] Int. Cl.⁶ ............................................. A01G 1/00
[52] U.S. Cl. ................................................ 47/78; 47/33
[58] Field of Search .................... 47/25, 33, 76, 78, 73, 47/75, 66

[56] References Cited

U.S. PATENT DOCUMENTS

| | | | |
|---|---|---|---|
| 3,184,890 | 5/1965 | McKay | 47/73 |
| 3,951,294 | 4/1976 | Wilson | 47/33 |
| 4,019,279 | 4/1977 | Moorman et al. | 47/25 |
| 4,179,846 | 12/1979 | Carlisle | 47/59 |
| 4,604,825 | 8/1986 | Mainprice | 47/76 |
| 4,665,645 | 5/1987 | Schau, III et al. | 47/25 |
| 4,955,156 | 9/1990 | Williams | 47/25 |
| 5,044,120 | 9/1991 | Couch | 47/79 |
| 5,070,642 | 12/1991 | Albrecht | 47/25 |
| 5,241,784 | 9/1993 | Henry | 47/66 |

FOREIGN PATENT DOCUMENTS

| | | | |
|---|---|---|---|
| 495242 | 8/1950 | Belgium | 47/73 |
| 326797 | 8/1989 | European Pat. Off. | 47/25 |
| 352225 | 1/1990 | European Pat. Off. | 47/33 |
| 3202684 | 8/1983 | Germany | 47/25 |
| 3717877 | 12/1988 | Germany | 47/33 |
| 1508997 | 9/1989 | U.S.S.R. | 47/73 |
| 8201460 | 5/1982 | WIPO | 47/73 |

Primary Examiner—Henry E. Raduazo
Attorney, Agent, or Firm—Merchant, Gould, Smith, Edell, Welter & Schmidt

[57] ABSTRACT

A root disbursement element is provided around the root ball of a tree, being adapted to direct some of the roots from the root ball downwardly while permitting others to grow outwardly. In those numerous situations where there is a hardscape near the tree, a root-control barrier is provided between the root disbursement element and the hardscape, in spaced relationship from the root disbursement element. The root-control barrier directs downwardly those roots that emanate outwardly from the disbursement element, to a depth sufficiently great that damage to the hardscape is prevented.

21 Claims, 4 Drawing Sheets

APPARATUS AND METHOD FOR GROWING STRONGLY-ROOTED TREES, AND PREVENTING ROOT DAMAGE TO HARDSCAPES

BACKGROUND OF INVENTION

Since the advent of the invention described in basic U.S. Pat. No. 4,019,279 for an effective root control barrier, there have been various patents describing actual and supposed improvements in apparatus for causing tree roots to grow downwardly to the bottom of the barrier and thereafter grow outwardly beneath a hardscape. There have not, insofar as applicant is aware, been patents describing elements for disbursing, spreading or distributing of tree roots in a controlled manner, for the purpose of rapidly anchoring the tree in the earth and achieving other significant results indicated below. In addition, there has not—insofar as applicant is aware—been an invention comprising the combination of such a root disbursement element with a root control barrier adapted to protect sidewalks, curbs, foundations and other hardscapes from root damage.

Stated in another manner, the art of root deflection and tree root containment is now, since the invention described in the above-indicated patent, well known and commercial. However, insofar as applicant is aware, all root control apparatus and methods manufactured and used since the invention described in such patent employ the concept of a contained root growth environment down to the bottom of the root control barrier. Applicant has now conceived that there is a major need for controlled root disbursement both within and in the absence of a root control barrier.

There is a long-existing need for a means and method to effect rapid deep-rooting of tree roots in the earth. In the absence of such rapid deep-rooting, relatively newly-planted trees tend to lean or fall over in response to heavy winds that blow against them.

It is known that, as trees become more and more mature, their roots create greater and greater pressures against surrounding or adjacent root control barriers. It is believed that, typically, the pressures against the barriers eventually rupture them. There is needed a method and apparatus for reducing internal root-expansion pressures within a root control barrier environment. This will extend the potential life expectancy of the root control apparatus, and ultimately ensure further the integrity of the surrounding hardscape for a longer period of time.

SUMMARY OF THE INVENTION

In accordance with one aspect of the present invention, there is provided a root disbursement element and method that effectively, and in a controlled manner that may be predetermined by the arborist, disburses the roots of trees so as to cause them to become relatively rapidly stabilized in the earth. This additionally, and at the earliest possible time, prevents the roots from circling or girdling the root ball after planting has occurred.

In accordance with another aspect of the invention, there is provided a combination of a root disbursement element and root control barrier, and an associated method, such that the tree roots are caused to be so located as to exert much less internal pressure against the barrier than in prior-art combinations.

In accordance with another aspect of the invention, there is provided an apparatus that first causes relatively early downward growth of tree roots of a newly-planted tree, and relative absence of circling or girdling, and which later—when the tree has matured to a substantial extent—ruptures so as to permit a certain amount of outward expansion of tree roots.

In accordance with another aspect of the invention, there is provided a method by which a root disbursement element is wrapped around a tree ball prior to planting thereof in the earth, following which the combination root disbursement element and tree ball are planted either within or in the absence of a root control barrier.

In accordance with a preferred method of performing the method, the upper portion of the root disbursement element is caused to act also as a dam for water so as to maximize the watering action relative to the young root ball.

In according with another aspect of the method and apparatus, there is provided the combination of a root disbursement element, root control barrier, tree, and hardscape, so that not only is the tree caused to have roots that are disbursed in a controlled manner but that are—when they mature—sufficiently far beneath the hardscape to prevent damage thereto.

In accordance with another aspect of the method, earth is packed around the root ball of a young tree through the openings in a surrounding root disbursement element, which openings are the same ones through which the roots will extend during controlled growth and disbursement of such roots. Accordingly, it is practical even with frustoconical root balls having downwardly-convergent conical walls, to have closely-encompassing root disbursement elements. These elements may be mounted on the root balls either prior or subsequent to planting in the earth, following which earth is introduced through openings in the disbursement elements so as to fill in the voids within the same.

DETAILED DESCRIPTION OF THE PREFERRED EMBODIMENTS

U.S. Pat. No. 4,019,279 is hereby incorporated by reference herein.

Figure 1:
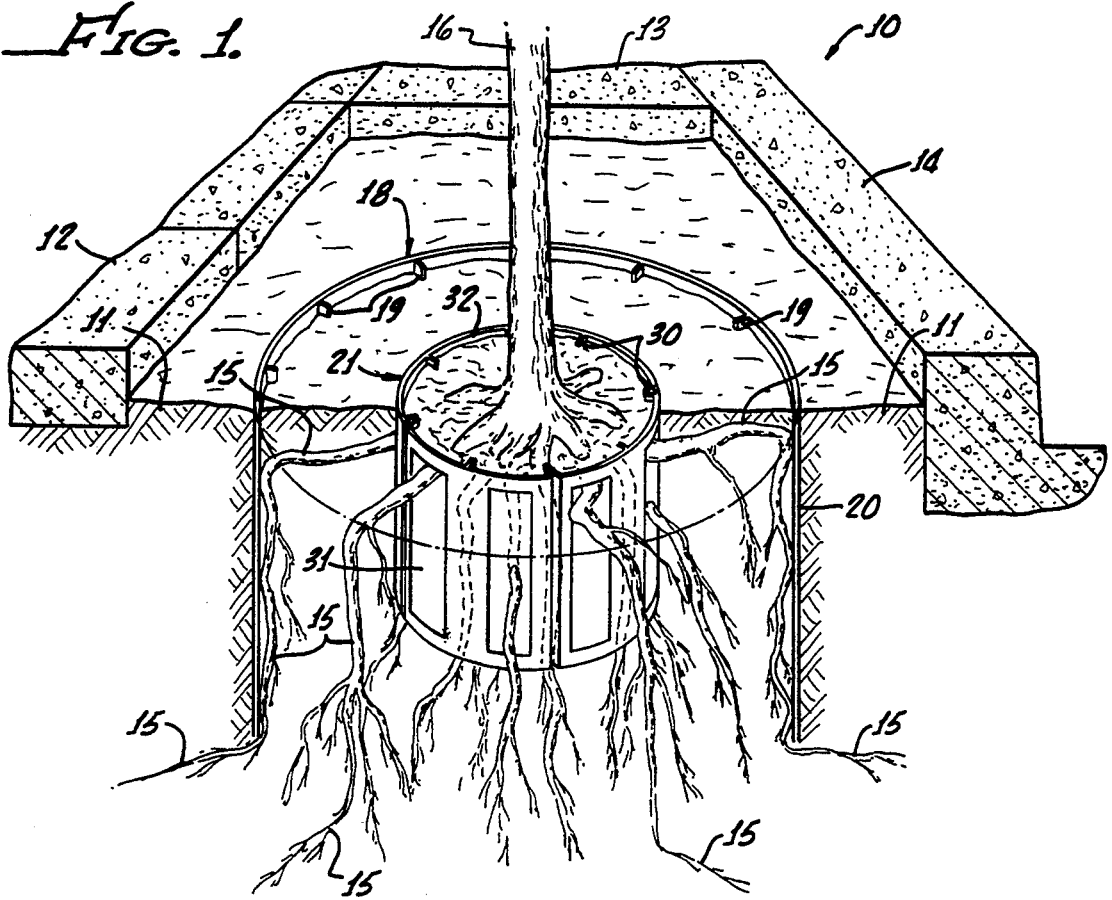
FIG. 1 is an isometric view of a combination root disbursement element and root control barrier, tree, and hardscape, portions of the root control barrier being broken away in order to illustrate some of the encompassed roots.
Figure 2:
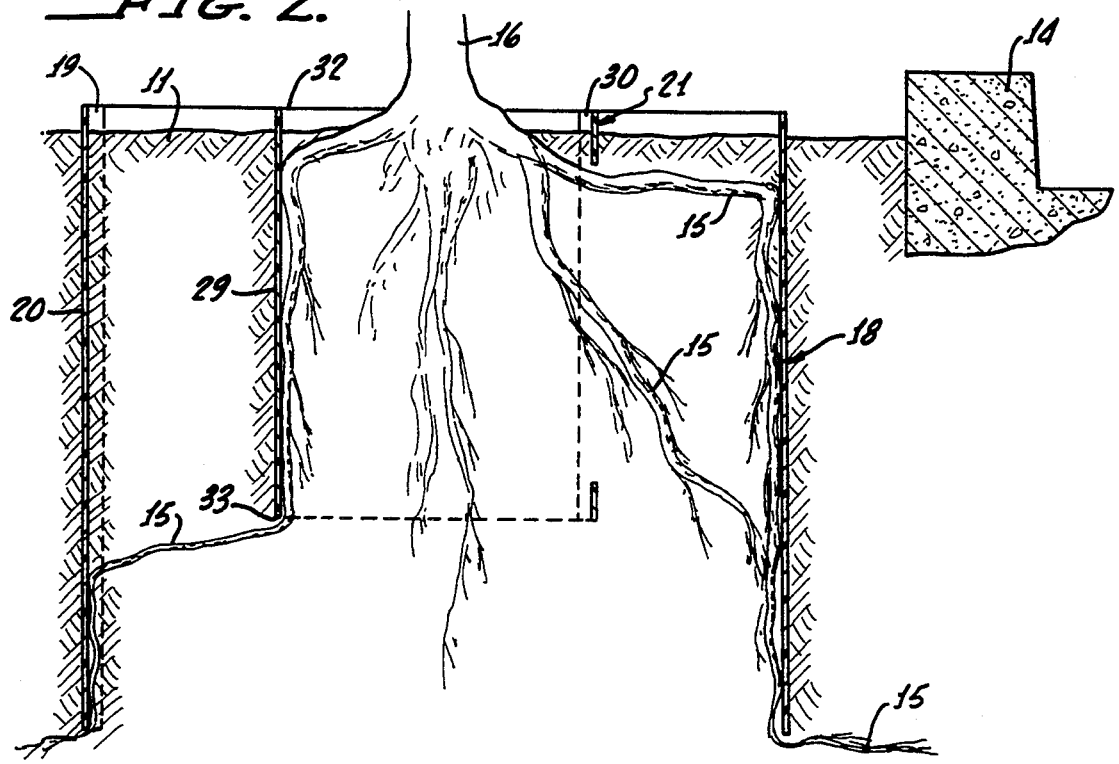
FIG. 2 is a vertical sectional view of the showing of FIG. 1, taken adjacent the tree trunk.

Referring first to FIGS. 1 and 2, there is shown a hardscape 10 that is anchored in the earth 11. The hardscape 10 (which is often termed in patent literature a "static structure") comprises, for example, a concrete sidewalk 12, a concrete crosswalk 13, and a concrete curb 14. Planted in the earth 11 in sufficiently close proximity to hardscape 10 that its roots 15 are likely to damage the hardscape, is a tree 16.

Figure 3:
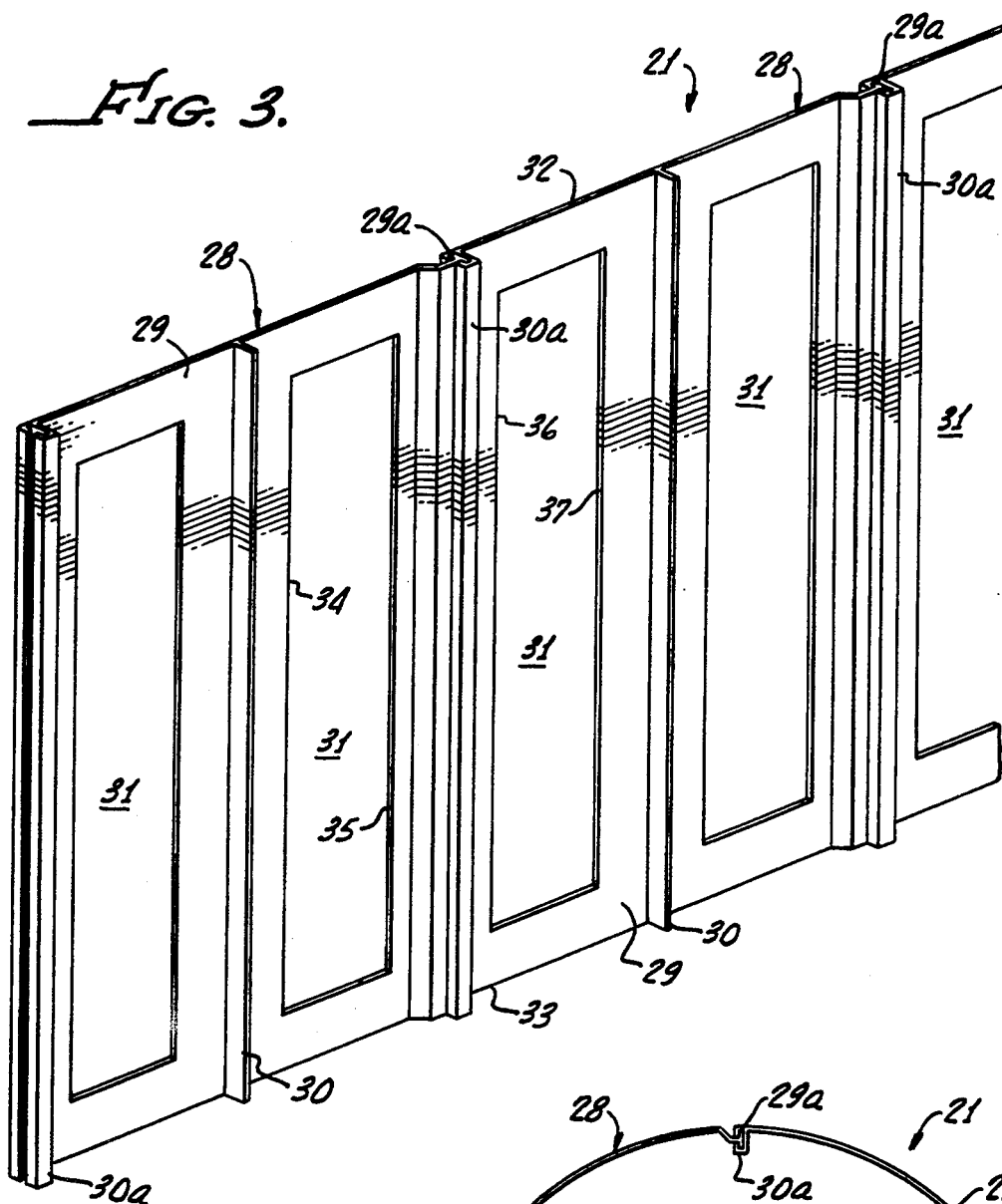
FIG. 3 is an isometric view showing portions of the root disbursement element.

A root control barrier 18 of any suitable type is mounted between tree 16 and hardscape 10. One type of root control barrier which may be employed is a planter, such as is shown in FIGS. 1, 3, and the upper part of FIG. 2 of the above-cited U.S. Pat. No. 4,019,279. Other types of root control barriers which may be employed are shown and described in U.S. Pat. No. 5,070,642, which is hereby incorporated by reference herein. Instead of encircling the tree 16, the root control barrier may be substantially linear and may extend (for example) along the sidewalk 12, crosswalk 13, and/or curb 14.

It is emphasized that the root control barrier is spaced a considerable distance away from the trunk of tree 16. Accordingly, the tree roots 15 must grow for considerable distances from the vicinity of the trunk of tree 16 to the root control barrier 18. This requires substantial time, especially when it is desired that some of the roots achieve considerable diameter.

The root control barrier 18 shown in FIGS. 1 and 2 is the same as that of FIGS. 1–6 of the above-cited U.S. Pat. No. 5,070,642. It has means for causing the roots 15 to bend downwardly instead of growing horizontally interiorly around the barrier. Preferably, such means comprise vertical ridges or ribs 19 that are on the tree side of the body 20 of each panel of the root control barrier 18.

THE ROOT DISBURSEMENT ELEMENT

Figure 4:
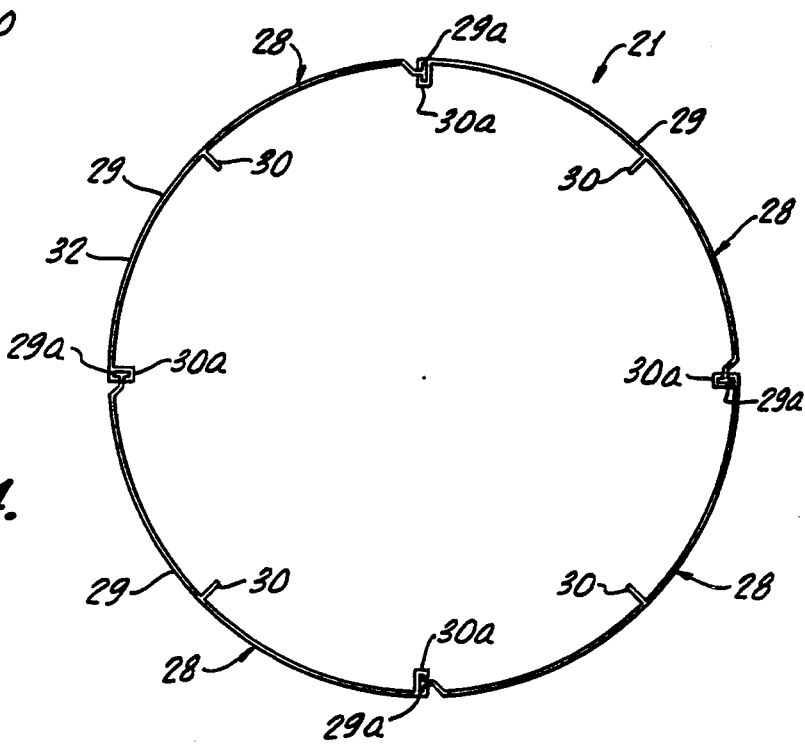
FIG. 4 is a top plan view of the root disbursement element after it has been made into cylindrical configuration.
Figure 5:
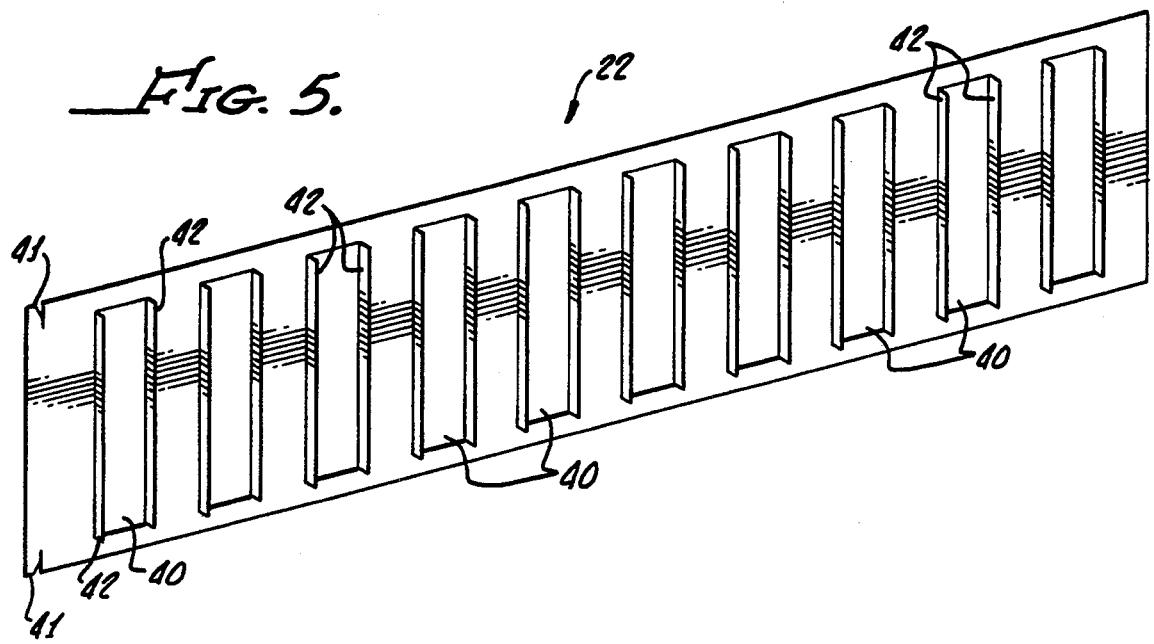
FIG. 5 is an elevational view of an elongate root disbursement element adapted to be wrapped around a tree root ball, with one end thereof secured in any desired root opening.

Mounted relatively closely around the roots of the tree, when the tree is young, and spaced from any root control barrier, is a root disbursement element. In the embodiment of FIGS. 1–4, and also FIGS. 6,7, the root disbursement element is shown and is numbered 21. In FIG. 5, another embodiment of root disbursement element is numbered 22, it being pointed out that this same root disbursement element may also be employed in the embodiment of FIGS. 1–4 and 6,7. Four additional embodiments of root disbursement elements are shown in FIGS. 8–10 and 11,12, being respectively numbered 23, 24, 25 and 26.

Stated generally, the root disbursement element is an element which is provided in the earth adjacent the roots of a newly planted tree, and which is so shaped and constructed as to direct some of the roots of such tree downwardly to a desired depth while at the same time permitting other roots of such tree to grow freely without being directed downwardly. The pattern of downwardly-directed tree roots, and those not directed, is controlled by selecting the appropriate pattern and/or positions of openings in the root disbursement element.

The root disbursement element is sufficiently close to the tree that it is engaged relatively soon by some of the growing tree roots. Thus, these tree roots are directed downwardly relatively soon, so as to provide an anchoring action for the root ball of the newly planted tree.

Where there is a root control barrier it is spaced away from the root disbursement element. The relationships are caused to be such that many of the roots that are directed downwardly by the root disbursement element do not engage the root control barrier; there is therefore much less outward pressure on the root control barrier—than would be the case if there were no root disbursement element. Accordingly, the barrier is believed to have a much longer life than would be the case in the absence of the root disbursement element.

The root disbursement element is sufficiently close to the tree that it, relatively soon, interrupts and redirects many girdling tree roots in a downward direction—this happening much earlier in the growth process than would occur in the absence of the root disbursement element. If there were no root disbursement element, the process of root girdling could continue unchecked.

There will now be described the construction of a first type of root disbursement element 21, with particular reference to FIGS. 1–4. The word "type" in the preceding sentence refers to the mechanical connections, etc., as distinguished from the pattern or shape of openings. There are four panels 28 (FIGS. 3 and 4) each of which is identical to each other, the four panels being connected together and being bent into a cylinder as best shown in FIG. 4. Each panel 28 has a flat (prior to bending) sheet-like body 29 and also has a plurality of vertical ridges or ribs 19, the latter being adapted to direct roots downwardly as soon as a root end grows into engagement with a rib or ridge.

Each panel 28 has formed integrally at opposite ends thereof male and female connectors of the tongue-in-groove type, and which are respectively numbered 29a and 30a. These are adapted to mate with each other when slid longitudinally relative to each other. Female elements 30a are so shaped as to serve also as ridges or ribs that deflect the tree roots downwardly. In the construction best illustrated in FIGS. 3 and 4, there is one ridge 30 midway between two end connectors 29a,30a, so that the ridges and end connectors alternate relative to each other.

The body 29 of each panel 28 has opening means therein through which the roots 15 from tree 16 may grow in uninhibited or substantially uninhibited manner. In the particular construction of FIGS. 1–4, such opening means or openings are numbered 31. These are vertically elongate wide slots that are rectangular in configuration, extending from a lower end near the bottom of the root disbursement element to an upper end relatively near the top thereof. As described later in this specification, the shapes and sizes of the openings 31 may be and are varied in order to adapt the root disbursement element to the particular situation, particular type of tree, etc.

In the embodiment of FIGS. 1–4, each rib or ridge 30 and each end connector 29a,30a is midway between two adjacent openings. Also in such embodiment, the openings 31 are identical to each other and are spaced equal distances from each other.

To state one example of size of the root disbursement element, the distance between the top edge 32 and the bottom edge 33 is sixteen inches (16"). Each opening or slot 31 has a vertical dimension of twelve inches (12"). The width of each opening or slot 31, that is to say the distance between (for example) the vertical edges 34,35 or 36,37 shown in FIG. 3, is three inches (3"). Also, the space between vertical edges 35,36 is three inches (3") in the example. The same is true relative to the other panels. Thus, in the opening arrangement shown relative to FIGS. 1-4, about fifty percent (50%) of the panels 28 (except above and below the panels) is opening, whereas about fifty percent (50%) is solid and not open.

The preferred material for the root disbursement element 27 is polyethylene, and the preferred thickness is about 0.30 inch. These are exemplary. Stated generally, the material employed for the panels 28, and thus for the body 28 of each panel and all other portions thereof, is so selected that the panels will stand by themselves and have a certain amount of rigidity, yet be sufficiently flexible to readily bend into cylindrical shape. Furthermore, the joints 29a,30a between the end elements are caused to be sufficiently weak that expanding roots will eventually rupture them.

As described subsequently, the diameter of the root disbursement element 21 is selected in accordance with the diameter of the root ball of the particular tree at the time of planting of the ball into the earth. On exemplary diameter of the element 21 is approximately nineteen inches (19").

Embodiment of FIG. 5

FIG. 5 illustrates a root disbursement element 22 that is a one-piece element, and that has the capability of being adjusted in diameter so as to conform to the exterior configuration of the root ball of a tree. As illustrated, there is an elongate body 39 of rectangular configuration. Provided in equally-spaced parallel relationship along the length of body 39, and extending perpendicular to the longitudinal axis thereof, are a multiplicity of wide slots 40 each of which is illustrated as being rectangular.

Adjustable end-connector means are provided to connect one end of body 39 to the other end thereof, or to connect one end of body 39 to an intermediate region of the body so as to achieve a cylinder of reduced diameter. The illustrated connector means comprise upper and lower tongues 41 adapted to be inserted through any desired slot 40 and then to come into engagement with one edge of the slot so as to maintain the root disbursement element in the configuration of a cylinder of the desired diameter. It is also possible to have added vertical slits (not shown) at spaced regions intermediate the end portions of slots 40, and which are adapted to receive the tongues 41 so as to provide a finer adjustment relative to the diameter of the cylindrical root disbursement element.

Formed vertically adjacent each edge of each slot 40 is a rib or ridge 42 which performs a root-deflecting function.

In a preferred method of manufacturing the root disbursement element 22 of FIG. 5, punch and die means are provided to punch the slots 40 and the tongues 41 out of strips or sheets of (for example) polyethylene—an exemplary thickness being 0.50 inch. During or subsequent to the punching, the ribs 42 are bent inwardly and caused to remain in bent relationship, for example by using heated dies to effect the bending.

Figure 6:
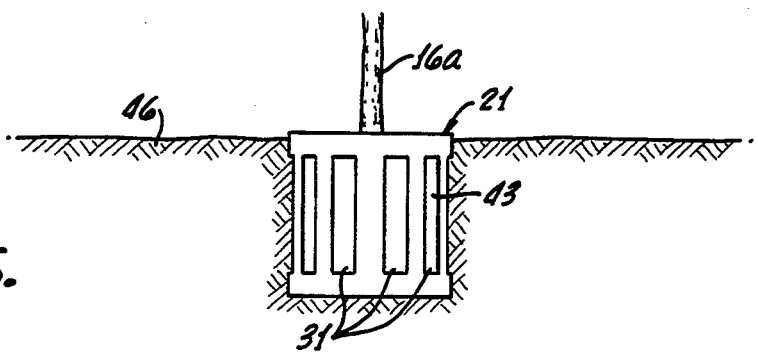
FIG. 6 is a side elevational view showing a root ball in the earth, with surrounding root disbursement element.

Description of the Method in Relation to Hardscapes, and Further Description of the Combination The first step in the method comprises selecting a young tree, of a type having roots that if uncontrolled would tend to damage sidewalks and other hardscapes, and having a root ball such as of the general type indicated at 43 in FIG. 6. The root ball 43 is known in the trade as a 15 gallon root ball. Other suitable root balls may be selected, for example one known in the trade as a 20 inch box, or one known in the trade as a 24 inch box. The 20 and 24 inch box root balls are typically frustums of inverted pyramids in exterior configuration, having downwardly convergent walls. The 15 gallon ball is, on the other hand, typically generally cylindrical.

The next step in the method comprises securing around the root ball 43 (or other root ball) the root disbursement element 21 of FIGS. 1-4 or, alternatively, root disbursement element 22 of FIG. 5. Other root disbursement elements may also be used, for example as stated below.

As the next, or as an earlier, step in the method, a root control barrier 18 (or other root control barrier) is provided in the earth 11 between the tree location and the hardscape location. In the showings of FIGS. 1 and 2, the root control barrier is concentric with the tree location, and is spaced a substantial distance radially-outwardly from the place where the root disbursement element 21 is—or is about to be—located.

Thereafter, or as an earlier step, the root ball 43 having the root disbursement element 21 (or 22 of FIG. 5) therearound is located concentrically within the root control barrier 18 as shown in FIGS. 1 and 2. During the planting operation, earth is introduced in a radial-inward direction through the slots or openings 31 so as to fill any voids within the element 21. This inward movement of earth is effected, especially, when the root ball has a downwardly-tapering frustoconical configuration. As described in the above-cited U.S. Pat. No. 4,019,279, gravel may be provided exteriorly around the root control barrier 18 to aid in deep watering of the roots.

The space between root control barrier 18 and root disbursement element 21 is filled with earth, and often planter mix, etc.

Very preferably, the method is so conducted that the upper edges of the bodies of the panels forming elements 18 and 21 are a short distance above the surface of the earth, for example one inch (1"). The latter is to create a water barrier relatively close to the tree trunk 16, which dams water within the upper portion of the root disbursement barrier and aids in maintaining the newly-planted root ball in moist condition.

It is emphasized that, at this early stage of the method, the tree roots of the tree 16 shown in FIGS. 1 and 2 are not in the intermediately-developed condition shown in such Figs., but instead are in the root-ball condition similar to that shown in FIG. 6. It is also pointed out that the outer roots of the root ball are frequently in an encircling or girdling configuration due to having been grown in one (and often more) containers of larger and larger size during development of the root ball.

Subsequent steps in the method are then performed by the elements 18,21 that are already in position, as the roots 15 grow outwardly from the root ball within root disbursement element 21.

Any girdling or circling roots on the exterior of the root ball 43 very soon grow into contact with ridges or ribs 30 and 30a (FIGS. 3 and 4) and are accordingly deflected downwardly. They then grow downwardly generally along the ridges or ribs until they reach the bottom edge 33 of the disbursement element. On the other hand, those roots in the root ball that reach an opening 31 prior to the time that they engage a ridge 30,30a turn outwardly away from the tree trunk 16. Thus, as shown in FIGS. 1 and 2, some of the roots 15 are illustrated as growing downwardly along the solid sections between openings 31, while others of the roots 15 are shown as growing outwardly through the openings 31 toward the root control barrier 18.

It is emphasized that those roots 15 which grow downwardly from the root disbursement element 21 effect a relatively early anchoring of the root ball and associated tree trunk 16 and tree in the earth 11, which provides early protection against blowing-over of the tree by a strong wind. Furthermore, many of the roots 15 that grow downwardly from the root disbursement element 21 do not come into engagement with the root control barrier 18. It follows that these roots do not exert any pressure against the root control barrier 18 and do not tend to rupture the same as the roots grow larger in diameter.

Many of the roots that grow downwardly out the bottom of disbursement element 21 grow outwardly toward the root control barrier 18, as shown at the lower-left in FIG. 2. These roots, however, engage the control barrier 20 and are deflected downwardly by the root-deflector means (such as vertical ribs or ridges 19) thereof after they come into contact therewith. After the bottom edge of the control barrier 18 is reached, the roots 15 typically grow outwardly beneath one or more portions of the hardscape 10. However, they are sufficiently far below the hardscape that expansion in the diameters of the roots 15 does not lift of damage the hardscape.

Those roots 15 that grow through the openings 31 from the root ball grow generally horizontally outwardly toward the control barrier 18. Then, they grow into contact with the ridges or ribs 19 (or other root-deflector elements) and are deflected downwardly until they emanate through the bottom of the control barrier 18. They then turn outwardly as shown at the left and right in FIG. 1, and at the lower right in FIG. 2, until they grow beneath the hardscape 10.

In the preferred form, the bottom of the root control barrier 18 is caused to extend much further downwardly into the earth than the bottom of the disbursement element 21.

As pointed out above, FIGS. 1 and 2 show the tree 16 and its roots 15 in an intermediate stage of growth. After the tree has matured to a much greater extent, there are many roots 15 beneath the hardscape 10, and these roots are much larger in diameter than are those illustrated at the extreme right (for example) in FIGS. 1 and 2. Despite the large diameters, the hardscape is not damaged.

It is emphasized that the method is the same when the root disbursement element of FIG. 5, for example, is employed.

Method and Apparatus of the Embodiment of the Invention in Which There is No Hardscape.

In performing the method illustrated in FIGS. 6 and 7, a root ball 43 of a young tree 16a is first encircled by a root disbursement element of a type described above or below, for example the root disbursement element 21 or 22. As above stated, the root ball may have various shapes, including cylindrical and downwardly-convergent.

The tree is then planted anywhere, for example in a forest in a reforestation projection, or in a large lawn far from any hardscape, or at any other desired location. As illustrated in FIG. 6, it is preferred that the upper edge of the root disbursement element 21 be about one inch (1") above the upper surface of the earth 46. As previously stated, and especially if the root ball is downwardly convergent, earth is packed inwardly through the openings 31 (or 40, relative to the embodiment of FIG. 5, or other openings described below) so as to fill in voids within the disbursement element.

Figure 7:
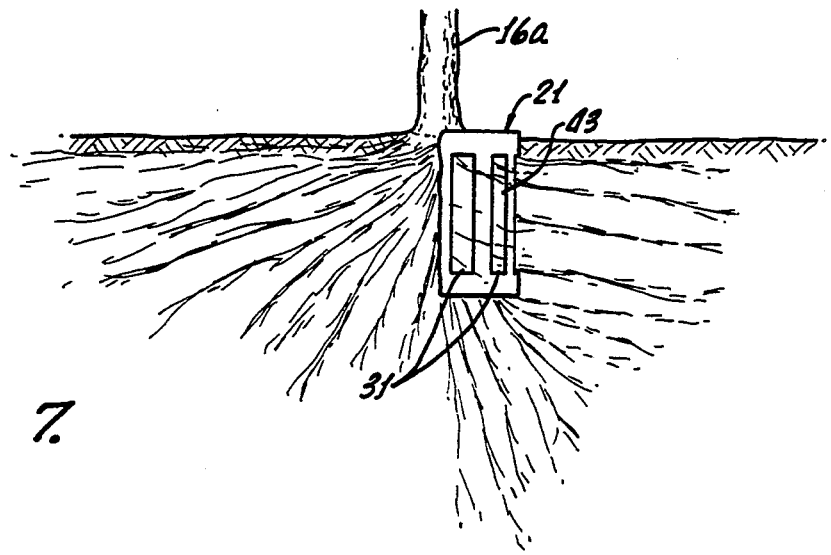
FIG. 7 corresponds to FIG. 6 but with part broken away, and showing growth of the tree roots from the root ball of FIG. 6.

Referring next to FIG. 7, those roots which engage the solid portions of disbursement element 21, that are not openings, will in large proportion grow downwardly along such solid portions and then grow out the open bottom of the disbursement element. The roots the emanate from the bottom of the disbursement element will thereafter grow in directions determined by soil conditions, nutrients and water, etc. For example, where there is relatively deep water the roots will tend to grow outwardly and downwardly as shown at the bottom portion of FIG. 7. Otherwise, they tend to grow generally horizontally outwardly as above stated.

On the other hand, the roots that pass through the openings 43 tend to grow generally horizontally in a relatively unrestricted manner, as illustrated. There is thus a relatively controlled disbursed root pattern that provides long-term strengthening of the tree against wind damage and other adverse effects.

In addition, and very importantly, the downward growth of roots along the solid portions of the disbursement element 21 hastens the anchoring of the root ball in the earth 46, so as to minimize the chances that the young tree will be blown over.

Embodiments of FIGS. 8–12, Inclusive

In the embodiments of FIGS. 8, 9, and 11, 12 the construction is the same as that described relative to FIGS. 1–4 except for the various openings for the roots. In the embodiment of FIG. 10, the construction is the same as that of FIGS. 1–4 except for the openings and except for the fact that the vertical ridges or ribs are immediately adjacent the sides of the openings instead of being midway therebetween.

It is emphasized that all of embodiments 8–12 may be constructed as described relative to FIG. 5, for example, instead of FIGS. 1–4.

All of the root disbursement elements of FIGS. 8–12 are adapted to replace the elements in FIGS. 1 and 2, and also FIGS. 6 and 7, relative to the combinations and methods described relative to such Figs.

Figure 8:
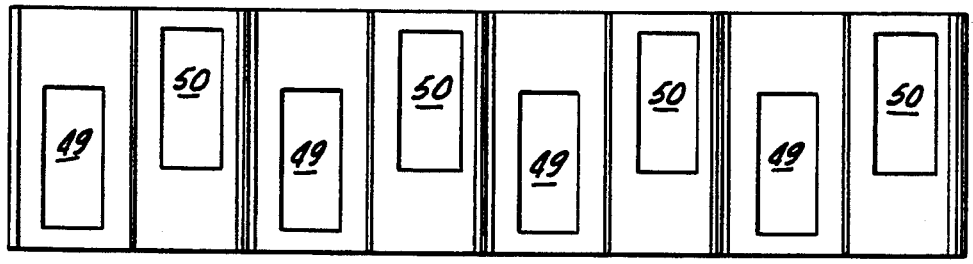
FIGS. 8-12 are plan views showing different root disbursement elements employed for different types of controlled root growth, each element being shown in its elongate form prior to bending into circular configuration, the elements of FIG. 11 and 12 being the same but one shown inverted relative to the other.

Referring first to FIG. 8, alternate sections of the root disbursement element 23 have low openings 49, while the remaining alternate sections have high openings 50. With this relationship, those tree roots that grow outwardly from tree trunk 16 or 16a and that extend through the openings 49 and 50 are caused to be at a relatively higher elevation or relatively lower elevation. This variation in elevations, in combination with those roots that grow out through the bottom of the root disbursement element, creates a very controllably-varied root pattern.

It is emphasized that the relative areas of the openings and the lands (nonopenings) is controlled relative to the various opening patterns as desired by the manufacturer or arborist. For example, the pattern of openings in element 23 of FIG. 8 may be such that 29 percent of the total area of the root disbursement element is openings.

Figure 9:
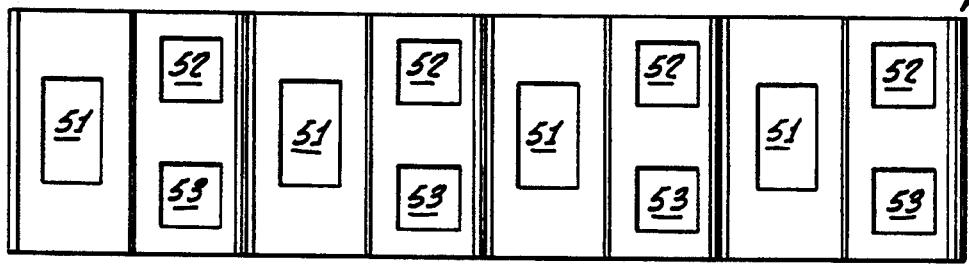
Figure 10:
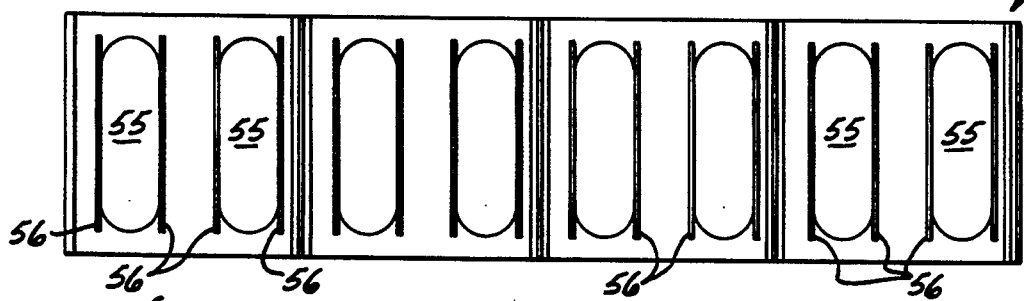

Referring next to the embodiment of FIG. 9, the root disbursement element 24 has an opening pattern and relationship whereby each alternate section has a relatively large centrally-located opening 51, while the remaining alternate sections have upper and lower— —and relatively smaller—openings 52 and 53 respectively. Accordingly, there is achieved a pattern of roots whereby at portions of the region surrounding the root disbursement element—above those roots which emanate from the bottom of the element 24—there will be a relatively narrowly-arranged (in openings 51) pattern of roots. In the remaining portions there will be upper and lower root patterns that respectively extend through openings 52,53. Again, as in FIG. 8, the total area of the openings is controlled. The total area of openings 51–53 is 19 percent of the total size of disbursement element 24.

Referring next to FIG. 10, the root disbursement element 25 has a plurality of spaced vertically-elongate openings 55. Closely adjacent each side of each opening 55 is a ridge or rib 56. In this embodiment, the upper and lower ends of the openings 55 are rounded instead of horizontal. The total area of openings 55 is 43 percent of the total size of disbursement element 25.

Figure 11:
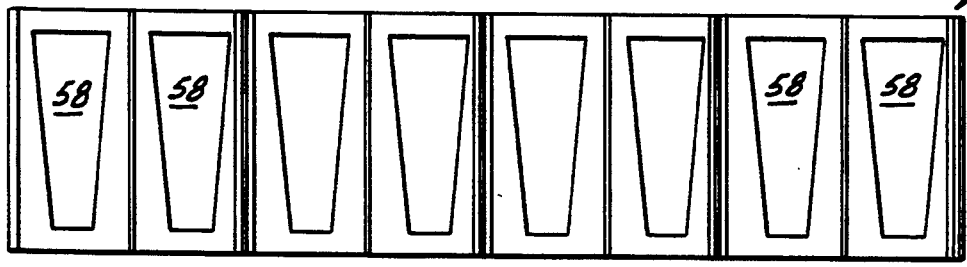
Figure 12:
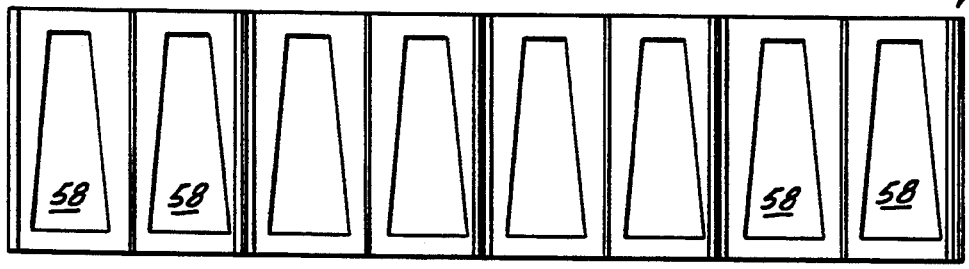

Referring to FIGS. 11 and 12, it is pointed out that the root disbursement element 26 is shown in these two figures in inverted conditions relative to each other. Thus, there are a plurality of tapered, for example trapezoidal, openings 58.

When the root system is rather passive, the disbursement element 26 is planted in the relationship illustrated in FIG. 11, with the bases of the trapezoids uppermost. Thus, relatively larger amounts of roots grow through the upper portions of the trapezoidal openings than grow through the lower portions thereof.

On the other hand, when the root system of the particular tree is relatively aggressive, the disbursement element 26 is inverted so as to be in the position of FIG. 12, with the bases of the trapezoids at the lowermost portion of the element. Accordingly, a greater proportion of roots then grow through the lower portions of the openings in order to counteract the effects of the aggressive root growth.

Summary and Additional Disclosure

The present apparatus and method simultaneously distribute the living tree root system into horizontal and vertical growth patterns, thus effecting a more balanced and well disbursed tree root system.

When root development and expansion begin to occur within the confines of the root disbursement element, physical root disbursement also begin to occur at the same time. The roots that grow through the open (for example slot) areas of the disbursement element maintain a normal growth pattern outwardly, since they are not physically effected by the physical properties of the disbursement element. On the other hand, those roots that physically contact the panels will be first deflected laterally (toward the right or the left) and will subsequently travel in the new direction until they contact the root deflecting ribs or ridges of the disbursement element. Then, the roots are directed downwardly toward the bottom of the disbursement element, from which they continue their search for water and nutrients in the soil below the root ball.

In the primary phase of root disbursement, different positive actions occur. In addition to disbursing the root system into horizontal and vertical growth patterns, the primary growth that is actively caused by the apparatus starts the process of relatively immediate deep rooting and consequent rapid tree stabilization against wind damage, etc. Because of the close proximity of the root disbursement element to the root ball of the tree, those roots that have been trained in a circular (or girdling) growth pattern around the perimeter of the root ball are interrupted and redirected downwardly when they contact the internal ribs (or other root-deflecting elements). This disruption of root girdling in a young tree is very advantageous.

Because of the immediate benefits, the long range effect of the root disbursement element on the surrounding root control barrier, where one is present, is very significant. Because of the fact that (for example) approximately fifty percent (50%) of the tree root system has been directly downwardly toward the lower region of the original root ball, the remaining mass of roots that would normally exert increasing pressure on a root control barrier is reduced by (for example) approximately fifty percent (50%). Thus, the effective life of the root control barrier is made longer.

Preferably, the root disbursement element is manufactured from a relatively thin (for example polyethylene) synthetic resin that will ultimately yield to internal root expansion pressures, and will thus allow expanding roots to continue their normal growth cycles.

There is faster deep rooting of a new tree ball than is the case relative to the prior art. Stated otherwise, there will be rapid tree stabilization, deeply into the ground. The roots that girdle the tree will be interrupted and redirected downwardly. A more balanced tree root system will be created. Inner watering of the new developing roots is promoted, while root expansion pressure on any surrounding root control barrier is reduced. Thus, the life expectancy of the surrounding root control barrier is increased. Future subterranean root expansion is promoted, while surface rooting of plantings is substantially reduced. The root disbursement barrier is an enhancement for circular or linear root control barriers, as well as being an excellent support system for slope plantings.

The material of which the root disbursement element is formed is thick enough to support itself around a tree, but thin enough that it doesn't create an excessive amount of pressure. The relationship is preferably such that the root disbursement element will stand in a circle, by its own strength, without being held upwardly.

As specific examples of relative sizes of root disbursement elements and root control barriers, a 15 gallon tree root ball closely encompassed by a root disbursement element is preferably provided in a root control barrier about 6 feet in circumference (about 2 feet in diameter). A 20 inch diameter box root ball is preferably provided in a root control barrier having a circumference of about 8 feet (about 2.5 feet in diameter). A 24 inch box root ball is preferably provided in a root control barrier having a circumference of about 10 feet (about 3.2 feet in diameter).

Preferably, the bottom portions of the root balls extend short distances below the lower edges of the root disbursement elements. Stated otherwise, the vertical dimensions of the root disbursement elements are somewhat smaller, preferably, than the vertical dimensions of the root balls. Thus, the downwardly-protruding bottom portions of the root balls are the relatively early source of roots that mushroom outwardly and create further stability of the young tree in the ground.

The foregoing detailed description is to be clearly understood as given by way of illustration and example only, the spirit and scope of this invention being limited solely by the appended claims.

What is claimed is:

1. A combination tree root disbursement and tree root barrier system, which comprises:
   a hardscape permanently disposed on the ground, said hardscape being of a type which can be damaged by tree roots,
   a tree planted in the ground in sufficiently close proximity to said hardscape that roots from said tree could, in the absence of a root barrier, reach and damage said hardscape,
   a root barrier disposed in the ground between said tree and said hardscape to prevent roots from said tree from reaching and damaging said hardscape, and
   a root disbursement element disposed in the ground between said tree and said root barrier,
   said root disbursement element being shaped to disburse the roots from said tree and to cause a smaller proportion of the roots from said tree to engage said root barrier than would be the case if said root disbursement element were not present.

2. The invention as claimed in claim 1, in which said root disbursement element is spaced a substantial distance from said root barrier.

3. The invention as claimed in claim 2, in which said root barrier extends down into the ground a substantially greater distance than said root disbursement element extends down into the ground.

4. The invention as claimed in claim 1, in which said tree is a relatively newly planted young tree having a root ball, and in which said root disbursement element has a sheet-like body mounted adjacent said root ball in encircling relationship thereto.

5. The invention as claimed in claim 1, in which said root disbursement element has a thin synthetic resin body that has openings therein for passage of roots from said tree through said openings, other portions of said body not having openings therein and being adapted to prevent passage of roots therethrough.

6. The invention as claimed in claim 5, in which said root disbursement element has means therein to deflect roots from said tree downwardly.

7. The invention as claimed in claim 4, in which said root disbursement element has an open bottom, in which said body has openings therein for roots, and in which means are provided to direct downwardly out said bottom roots from said tree which do not pass through said openings.

8. A root disbursement element comprising a synthetic resin body defining a generally flat wall adapted to be secured in a generally cylindrical configuration and having a sufficient wall thickness to stand alone when in a generally cylindrical configuration,
   said body having an open top and an open bottom when in a generally cylindrical configuration,
   said body having a plurality of openings for receiving a first plurality of tree roots that do not grow out said open bottom,
   means on said body for receiving and directing out of said open bottom a second plurality of tree roots and
   in which there are at least several of said openings, each opening being elongate and extending from the vicinity of said open top to the vicinity of said open bottom, said elongate openings being spaced from each other distances sufficient to permit major root growth therebetween and out said open bottom, and in which said root directing means are parallel to said openings and are disposed between said openings.

9. The invention as claimed in claim 8, in which said openings are tapered whereby to decrease in area from between said open top and open bottom, whereby a degree of root control may be achieved by inverting said root disbursement element.

10. The invention as claimed in claim 8, in which there is only one root directing means between each two adjacent ones of said openings, each said one means being generally midway between the associated two adjacent openings.

11. The element as claimed in claim 8, in which said body is elongate and flat and is adapted to be bent into generally cylindrical configuration, and in which there are connector means on said body to connect the end portions thereof together to form said body into generally cylindrical shape.

12. The invention as claimed in claim 11, in which said connector means are ears on one end of said body, and opening means on the other end portion of said body, said ears being adapted to extend into said opening means to make a connection.

13. A root disbursement element for location in the ground comprising:
   a synthetic resin body defining a generally flat wall adapted to be secured in a generally cylindrical configuration and having a sufficient wall thickness to stand alone when in a generally cylindrical configuration,
   said body having an open top and an open bottom when in a generally cylindrical configuration,
   said body having a plurality of openings for receiving a first plurality of tree roots for growth into the adjacent ground, root directing means on said body for receiving and directing out of said open bottom a second plurality tree roots
   each opening being elongate and extending from the vicinity of said open top to the vicinity of said open bottom, said elongate openings being spaced from each other distances sufficient to permit major root growth therebetween and out said open bottom, and said root directing means are disposed between said openings.

14. A root disbursement element wherein the root disbursement element is for defining an area of enclosed ground and an area of adjacent ground:
   a synthetic resin body defining a generally flat wall adapted to be secured in a generally cylindrical configuration and having a sufficient wall thickness to stand alone when in a generally cylindrical configuration, the wall being non-corrugated when viewed from the top or bottom of the configuration,
   said body having an open top and an open bottom when in a generally cylindrical configuration,
   said body having a plurality of openings for receiving a first plurality of tree roots for growth into the adjacent ground,
   means on said body projecting inwardly from the wall to direct a second plurality of tree roots out said open bottom tree roots that do not grow through said openings, the openings being spaced from each other distances sufficient to permit major root growth therebetween and out said open bottom, and wherein said root directing means are disposed between at least some of said openings.

15. A combination tree and root disbursement element of claim 14 wherein the tree includes a root ball and the disbursement element is mounted about the root ball.

16. A root disbursement element for location in the ground comprising:
a synthetic resin body defining a generally flat wall adapted to be secured in a generally cylindrical configuration and having a sufficient wall thickness to stand alone when in a generally cylindrical configuration,
said body having an open top and an open bottom when in a generally cylindrical configuration,
said body having a plurality of openings for receiving a first plurality of tree roots for growth into the adjacent ground,
means on said body for receiving and directing out of said open bottom a second plurality tree roots, and
said openings being spaced from each other a sufficient distance to permit major root growth therebetween and out said open bottom, and in which said root directing means is directed in a direction generally from the open top to the open bottom, and projected inwardly from the wall.

17. A disbursement element as claimed in claim 16 wherein the root directing means is dispersed between the openings, the openings are elongated, and the elongated openings are constituted by at least one opening.

18. A disbursement element as claimed in claim 16 wherein the openings are elongated, and have one end wider than an opposite end thereby to form a tapering cross-section from top to bottom of the wall.

19. A combination tree and root disbursement element of claim 16 wherein the tree includes a root ball and the disbursement element is mounted about the root ball.

20. A combination tree and root disbursement element wherein the tree includes a root ball and the disbursement element is mounted about the root ball, and wherein the root disbursement element is for location in the ground and comprises:
a synthetic resin body defining a generally flat wall adapted to be secured in a generally cylindrical configuration and having a sufficient wall thickness to stand alone when in a generally cylindrical configuration,
said body having an open top and an open bottom when in a generally cylindrical configuration,
said body having a plurality of openings for receiving a first plurality of tree roots for growth into the adjacent ground,
root directing means on said body which is essentially longitudinally directed for receiving and directing out of said open bottom a second plurality of tree roots, and
each opening being elongated and extending from the vicinity of said open top to the vicinity of said open bottom, said openings being spaced sufficient to permit major root growth therebetween and out said open bottom.

21. A combination tree and root disbursement element wherein the tree includes a root ball and the disbursement element is mounted about the root ball, and wherein the root disbursement element for location in the ground comprises:
a synthetic resin body defining a generally flat wall adapted to be secured in a generally cylindrical configuration and having a sufficient wall thickness to stand alone when in a generally cylindrical configuration, the wall being non-corrugated when viewed from the top or bottom of the configuration,
said body having an open top and an open bottom when in a generally cylindrical configuration,
said body having a plurality of openings for receiving a first plurality of tree roots for growth into the adjacent ground, said roots not growing out said open bottom, and
root directing means on said body which is essentially longitudinally directed for receiving and directing out of said open bottom a second plurality of tree roots, and, the openings being spaced from each other distances sufficient to permit major root growth therebetween and out said open bottom.

* * * * *